Jan. 21, 1941.    L. KAMENAROVIĊ    2,229,247
CONTROL DEVICE FOR HYDRAULIC BRAKES
Filed May 25, 1938    2 Sheets-Sheet 1

Inventor:
L. Kamenaroviċ
By E. F. Wenderoth
Atty

Patented Jan. 21, 1941

2,229,247

UNITED STATES PATENT OFFICE 2,229,247

CONTROL DEVICE FOR HYDRAULIC BRAKES

Leone Kamenarovič, Milan, Italy, assignor to Fabbrica Italiana Magneti Marelli S. A., Milan, Italy, a corporation of Italy Application May 25, 1938, Serial No. 210,061
In Italy May 26, 1937

3 Claims. (Cl. 60—54.6)

This invention relates to devices for the control and actuation of liquid operated brakes for vehicle wheels of the kind in which a pressure-generating plunger of a master cylinder containing the liquid which is intended to energize the brake-driving pistons of a plurality of brake cylinders, is actuated by a piston of a cylinder energized by a gas pressure as by a supply of compressed air or by a depression making atmospheric air pressure operative on said piston.

This invention has for its object a device of this class comprising an improved arrangement of the several operative parts by which the transmission means located between said plunger and piston in the known deivces may be omitted, and the actuating cylinder piston is made directly operative on the master cylinder plunger with obvious advantages as a simplified construction of the device, an improved safety of operation and a reduction in overall size and weight.

The drawings show an embodiment of the present invention.

Figure 1:
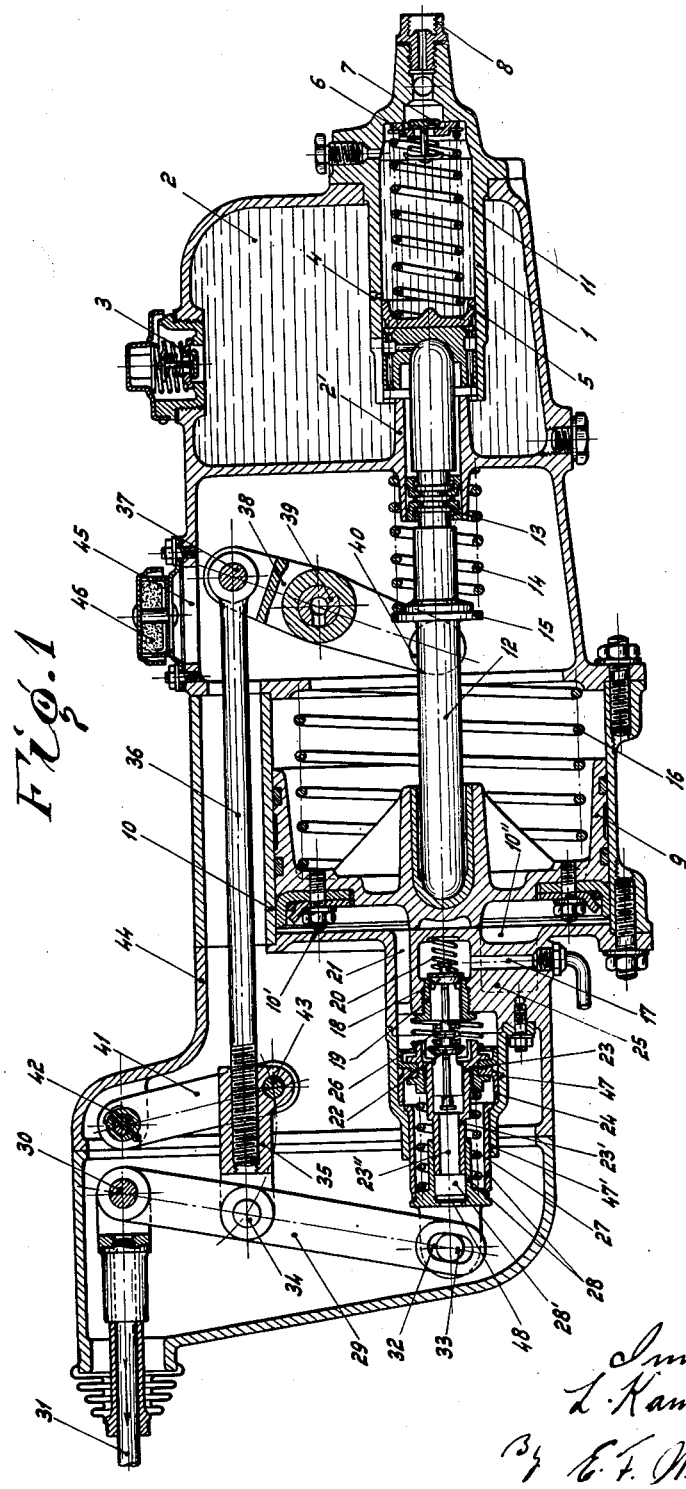
Fig. 1 shows a longitudinal section thereof.

The device includes a master cylinder 1 located within a chamber 2 which contains a liquid adapted to be put under pressure in said cylinder 1 and supplied to brake cylinders (not shown) connected with said master cylinder 2, a vent and pressure balancing valve 3 being provided in the wall of said chamber 2. The master cylinder 1 is connected with the chamber 2 by means of an inlet port 4 and opens through a double valve 6, 7 to an outlet 8 adapted for connection with said brake cylinders.

A plunger 5 is arranged to reciprocate in the cylinder 1 to put the liquid therein under pressure and force it out through valve 6, 7 and outlet 8 and a return spring 11 acts on said plunger. The plunger 5 is driven by a piston 9 arranged to reciprocate in an operating cylinder 10 aligned with master cylinder 1; said piston 9 is adapted to be operated by air pressure subject to the operation of a control valve device as hereinafter described and has a return spring 16 acting thereon. An intermediate rod 12 mounted to reciprocate in a stationary sleeve 2' integral with the wall of chamber 2 and aligned with the master cylinder 1 and operating cylinder 10 acts to impart the action of piston 9 to plunger 5; packing rings 13 are provided in cooperation with said rod 12 and sleeve 2' and a return spring 14 acts on a flange 15 of the rod 12 in the same direction as springs 11 and 16 act on the respective piston 9 and plunger 5.

Compressed air intended to actuate the piston 9 of the operating cylinder 10 is fed to the device at 17 from any appropriate source.

The control device includes a valve 18 cooperating with a stationary seat 19 provided in a chest referenced in its whole by 25 and integral with the head 10' of the cylinder 10; said valve 18 is loaded by a spring 20 and controls the intercommunication of the supply duct 17 with a passage 21 which opens in the adjacent end of the cylinder 10.

An outlet valve 22 is connected with the valve 18 with a restricted freedom in longitudinal and transverse direction and said valve 22 cooperates with a movable seat 23 which is mounted to reciprocate by its sleeve 24 in a cylinder 47 extending from said chest 25 and cylinder 10; a return spring 26 acts on said movable seat 23. The coupled valves 22 and 18 are actuated through an intermediate spring 27, by a slider or follower 28 mounted to reciprocate within a portion 47' of the cylinder 47 and on the extension 23' of the seat 23; the seat 23, extension 23' and slide 28 are provided with a central passage 23'' and 28' and an air filter 48 is located at the outlet of passage 28'.

The slide 28 is actuated by a brake control pedal or equivalent member, not shown, by means of a lever 29 having one of its ends pivotally connected, as at 30, with a control rod 31 which in turn is connected with the control pedal or equivalent member (not shown); the opposite end of said lever has an elongated slot 32 in which a finger 33 fast on the slider 28 is engaged.

The lever 29 is fulcrumed, at a point intermediate its ends, on a pivot 34 carried by a head 35 fast on a rod 36 extending along the cylinder 10 and having its opposite end pivotally connected at 37 on one of the ends of a rocker 38; said rocker 38 has at its opposite end a finger 40 operative on the flange 15 of the intermediate rod 12 and is pivotally carried at a point intermediate its ends by a pivot stud 39 fast in the device casing 44.

The rod 36 is supported by a link 41 pivoted at one end on a stationary pivot 42 and carrying a stud 43 at its opposite end which pivotally supports the head 35 of the rod 36.

The assembly of pressure gas cylinder 10 and control device is enclosed and protected by the device casing 44 which is integral with the liquid chamber 2; the space within said casing communicates with outside through a port 45 and an air filter 46.

Assuming the device to be in inoperative position as illustrated, when the control rod 31 is acted on by a control member as a control pedal in the direction of the arrow marked thereon to cause the brake application, the lever 29 is caused to oscillate on the pivot stud 34 which is stationary because of the finger 40 of rocker 38 abutting on the flange 15 of rod 12 which is under the action of the springs 11 and 14 and holding the parts 38, 36, 35, 41 stationary; then said lever 29 shifts the slider 28 towards right hand, as seen on Fig. 1 of the drawings, and acts on the movable seat 23 by the intermediate of the spring 27; said seat 23 is thus carried into engagement with the valve 22 and the communication of the cylinder chamber 10" and duct 21 with outlet 23", 28' is cut off. The continued stroke of the valve 22 under the action of the seat 23 operated as above described by the parts 27, 28, 29, 31, causes the valve 18 to open against the action of its spring 20 and consequently compressed air is admitted from the supply duct 17 to chamber 10" of the cylinder 10.

The piston 9 is thus caused to move against the action of its spring 16 and in turn it shifts the rod 12 and the plunger 5 of the master cylinder 1, the liquid enclosed in the cylinder 1 being thus forced through the outlet 8 to conduits (not shown) connected with it and leading to the several brake cylinders to be operated to apply the brakes.

On the operator releasing the brake pedal and the rod 31, the described action of the slider 28 and spring 27 on the movable seat 23, 24 of the control device is released; then the springs 20 and 26 cause the valve 18 and the seat 23 to move back and thus the compressed air feed to cylinder chamber 10" from supply 17 is cut off and said chamber 10" is connected with exhaust through passage 21, the port intermediate the valve 22 and the seat 23, passages 22" and 28', the space within casing 44, the outlet port 45 and the filter 46. Then the piston 9 is moved back by the spring 16 and the rod 12 and plunger 5 move back with it under the action of respective springs 14 and 11; thus the brake operating liquid may flow back into the cylinder 1 from the several brake cylinders under the action of the respective springs (not shown) the valve 6 opening under these circumstances.

Should the supply of compressed air at 17 be defective, the actuation of plunger 5 to produce a brake applying liquid pressure in the cylinder 1 occurs at the time the control rod 31 is actuated and the slider 28 with parts actuated thereby have been moved through their full strokes and they come to rest.

Figure 2:
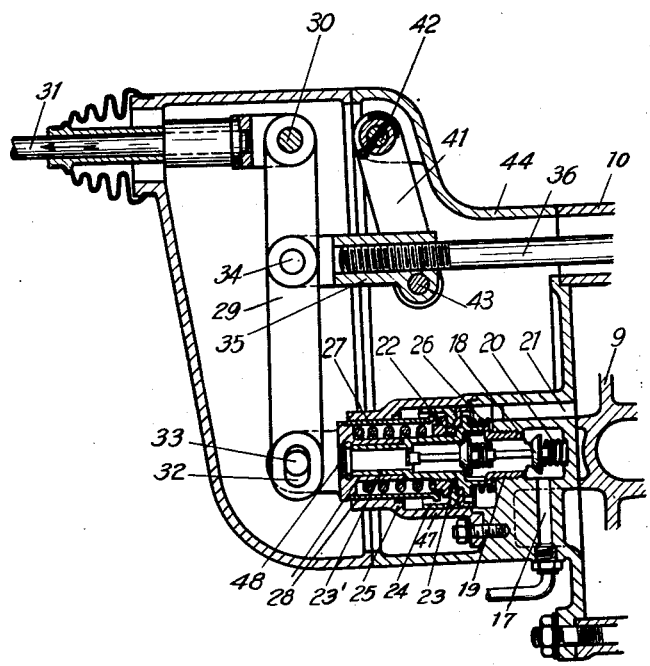
Fig. 2 shows a longitudinal section through the valve means in extreme position.

In fact in the now assumed conditions (shown in Fig. 2) the continued action on the rod 31 in the direction of the arrow causes the lever 29 to oscillate about the stud 33 as a stationary point or fulcurm and then a pull is developed on the rod 36 which causes the rocker 38 to oscillate around pivot stud 39 and to actuate the rod 12 directly by its finger 40 engaging the flange 15 of said rod; the plunger 5 is thus driven to force liquid out from the master cylinder 1 through valves 6, 7 and outlet 8 to energize the brake cylinders.

By the described organisation in which the master cylinder 1 is aligned and concentric with the pressure gas operated cylinder 10 and the action of the piston 9 of the cylinder 10 is imparted to the plunger 5 of the master cylinder 1 by an intermediate thrust operating member 12, an entirely safe operation is secured while the size, weight and cost of the apparatus are reduced. These advantages are made still more prominent by the arrangement of the control valve device concentric and aligned with the cylinder 10 and the master cylinder 1.

The control valve device actuating lever 29 is arranged to be substantially perpendicular to the line along which the slider 28 actuated by it moves and a lost motion is provided by the slot 32 with respect to the finger 33, as above described; accordingly no objectionable transverse action is developed by said lever 29 on the control valve parts.

On the other hand the lever 29 is satisfactorily guided in its displacement by the fact that its pivot 34 is carried by the rod 36 which is supported by the rocker 38 and link 41, these two parts being pivoted on stationary pivot studs.

In the described construction the exhaust of the compressed air which has been admitted from the supply duct 17 and has operated the piston 9 of the cylinder 10 occurs inside the casing 44 which encloses the several parts of the device; the volume of air thus introduced at each operation within said casing 44 balances or also exceeds the volume of the space that the piston 9 of the cylinder 10 leaves free in said casing 44 during its return stroke; consequently air is never caused to enter the casing 44 through port 45 and on the contrary at each operation of the device an amount of air is exhausted to outside, thus preventing impurities from entering the device and clogging the filter 46.

In detail, at the time compressed air is introduced into the cylinder 10 from supply 17 to cause the brake application the piston 9 forces a volume of air to outside of the casing 44 through port 45 and filter 46, which is in proportion with the diameter and the stroke of the piston 9. At the time the air pressure is released in the cylinder 10 by the described operation of the control valve device and of respective control parts 29, 31, the return stroke of the piston 9 into its cylinder 10 under the action of return spring 16, which would by itself be able to cause an air input into the casing 44 through filter 46 and port 45, follows and accompanies the release of seat 23 from cooperating valve 22 and the consequent exhaust of the volume of compressed air enclosed within the cylinder 10 and passage 21, into the casing 44 through the passages 23", 28' said air expanding in the casing 44 and escaping through port 45 and filter 46.

The volume of the air thus discharged and expanding in the case 44 is greater than that necessary to compensate for such increase of the space free within the casing 44 as is due to the return stroke of the piston 9 and consequently also in this stage of the operation an air escape occurs from the casing 44 to the outside through port 45 and filter 46.

What I claim as my invention and desire to secure by United States Letters Patent is:

1. A device for control and actuation of liquid pressure actuated brakes for vehicle wheels having a master cylinder with a plunger operative therein and an actuating cylinder with a piston operative therein, said cylinders being aligned with each other, and control means aligned with said cylinders for supplying and exhausting a pressure gas into and from said actuating cylinder, comprising a member intermediate said piston and plunger and abutting against said plunger and said piston loosely, return means for said plunger and member and piston, an operating lever under the driver's action at one of its ends, said lever being pivotally connected at its other end with said control means, a rocker pivoted at a stationary point of the device, said rocker engaging at one of its ends said intermediate member for positive actuation thereof and of said plunger, and a coupling rod pivotally connected with said rocker at the other end thereof and with said operating lever at a point thereof intermediate its ends.

2. A device for control and actuation of liquid pressure actuated brakes for vehicle wheels having a master cylinder with a plunger operative therein and an actuating cylinder with a piston operative therein, said cylinders being aligned with each other, and control means for supplying and exhausting a pressure gas into and from said actuating cylinder, comprising a member intermediate said piston and plunger and abutting against said plunger and said piston loosely, return means for said plunger and piston, separate return means for said intermediate member, an operating lever manually actuable at one of its ends, said lever being pivotally connected at its other end with said control means, a rocker pivoted at a stationary point of the device, said rocker engaging at one of its ends said intermediate member for positive actuation thereof and of said plunger, and a coupling rod pivotally connected with said rocker at the other end thereof and with said operating lever at a point thereof intermediate its ends.

3. A device for control and actuation of liquid pressure actuated brakes for vehicle wheels having a master cylinder with a plunger operative therein and an actuating cylinder with a piston operative therein, said cylinders being aligned with each other, and control means for supplying and exhausting a pressure gas into and from said actuating cylinder, comprising a member intermediate said piston and plunger and abutting against said plunger and said piston loosely, return means for said plunger and member and piston, an operating lever manually actuable at one of its ends, said lever being pivotally connected at its other end with said control means, a rocker pivoted at a stationary point of the device, said rocker engaging at one of its ends said intermediate member for positive actuation thereof and of said plunger, a coupling rod pivotally connected with said rocker at the other end thereof and with said operating lever at a point thereof intermediate its ends, and a casing enclosing said actuating cylinder and said control means, said casing being in communication with said actuating cylinder and with the outlet of said control means and having an outlet opening into the atmosphere.

LEONE KAMENAROVIČ.